INVENTORS
DAFYDD W. EVANS
RICHARD A. WAGNER

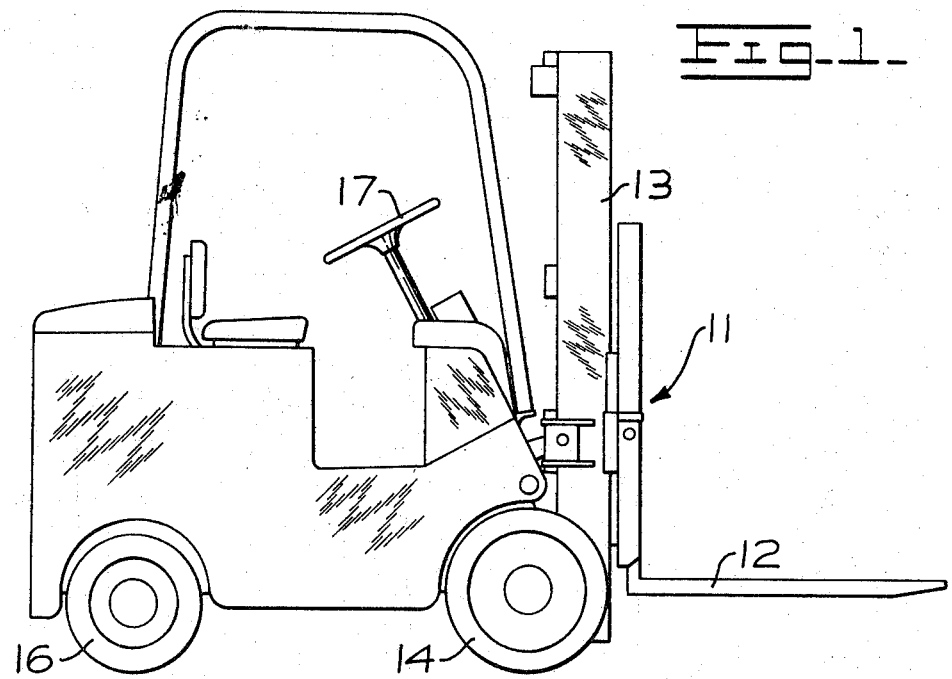
Fig-1-
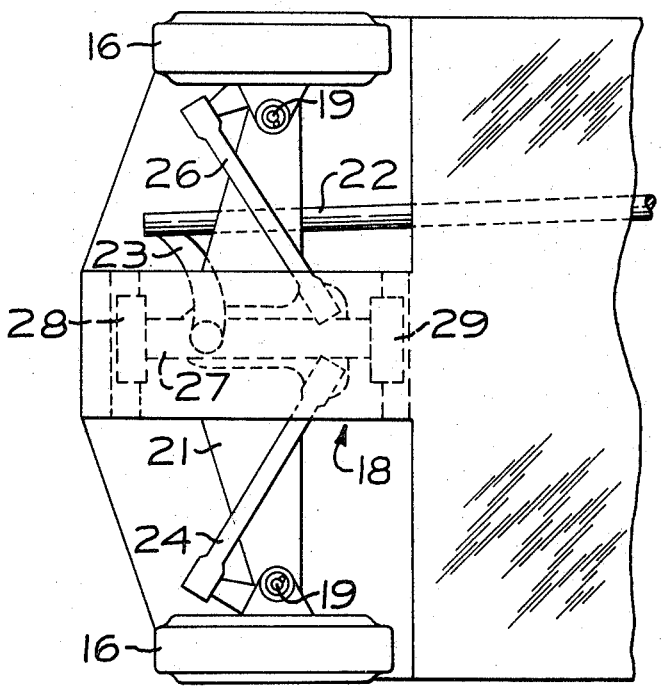
Fig-2-
INVENTORS
DAFYDD W. EVANS
RICHARD A. WAGNER
ATTORNEYS

United States Patent Office 3,528,677
Patented Sept. 15, 1970

3,528,677
SUSPENSION ASSEMBLY FOR INDUSTRIAL TRUCKS
Dafydd W. Evans, Cleveland Heights, and Richard A. Wagner, Euclid, Ohio, assignors to Towmotor Corporation, Cleveland, Ohio, a corporation of Ohio
Filed Jan. 13, 1969, Ser. No. 790,763
Int. Cl. B60g 11/02
U.S. Cl. 280—95                                    7 Claims

ABSTRACT OF THE DISCLOSURE

In an industrial truck having a dirigible wheel axle at one end, a suspension assembly comprising a leaf spring secured at its center to the axle and arranged normally thereto, means secured to the frame and interacting with respective ends of the left spring to limit longitudinal and lateral motion of the spring and a resilient pad respectively supporting the frame upon each end of the leaf spring while permitting oscillation of the axle about a longitudinal axis.

---

The present invention relates to a suspension assembly for supporting one end of an industrial truck upon an axle having dirigible wheels at each side. More particularly, the invention is advantageously adaptable to industrial trucks of the type having a lift assembly mounted at one end.

Suspension assemblies employed for industrial trucks in the prior art have generally been one of two types. In one type of arrangement, one or more springs act upon pins which are secured to the truck frame. The springs permit vertical movement or oscillation of the frame upon the axle to soften the ride for the operator and protect a load being carried by the truck. However, these simple spring assemblies are undesirable in that they offer resistance to rotation of the axle about a longitudinal axis of the truck. With powered wheels supporting the other end of the truck, this arrangement may interfere with proper traction of the drive wheels when the truck is operating on an uneven surface or carrying an unbalanced load. The entire machine weight may then be shifted or transferred with the result that one drive wheel may be raised from engagement with the ground to the extent that it loses traction. Undesirable torsional stress may also appear in the springs or portions of the axle and frame with which the springs are associated.

A trunnion supported axle readily permits rotation of the axle about a longitudinal axis of the truck. With this arrangement, all of the wheels tend to remain in engagement with the ground while torsional stresses are avoided in the suspension assembly. However, this type of assembly does not provide the desirable cushioning effect in the truck for softening its ride. Numerous types of suspension assemblies are employed in other vehicles, for example, automobiles, which combine the advantages of both types of suspension assemblies discussed above. However, these arrangements are generally complex and expensive and are not adaptable to industrial trucks as contemplated in the present invention.

Accordingly, it is an object of the present invention to provide a simple suspension assembly which combines the advantages of both the spring and trunnion suspensions described above.

It is a further object to provide a suspension assembly wherein one end of an industrial truck is supported by resilient pads upon a longitudinal leaf spring to permit oscillation of the spring and an axle attached thereto about a longitudinal axis of the truck.

Other objects and advantages of the invention are made apparent in the following description having reference to the accompanying drawings.

Figure 3:
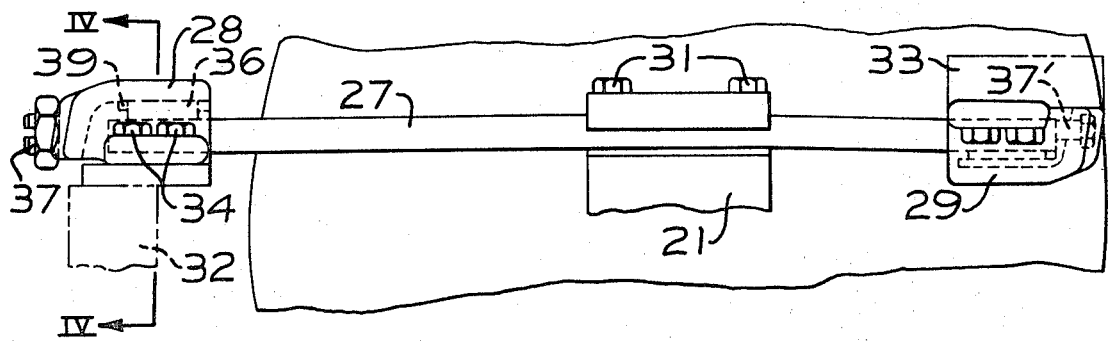
Figure 4:
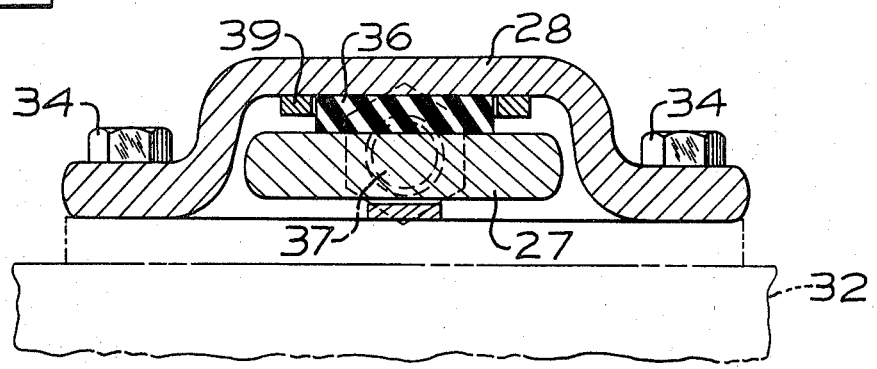
Figure 5:
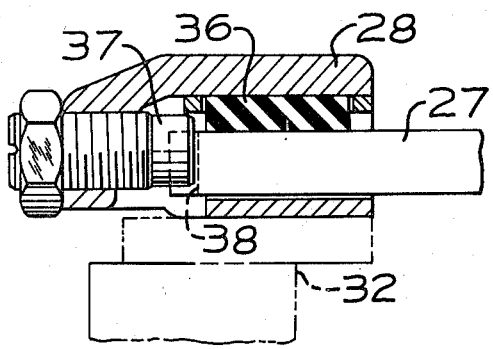

In the drawings:
FIG. 1 is a side view in elevation of an industrial truck equipped with a lift assembly;
FIG. 2 is a bottom plan view of the rearward portion of the vehicle in FIG. 1 which is supported by dirigible wheels;
FIG. 3 is a fragmentary side view in elevation of the suspension assembly for the dirigible wheels of the truck;
FIG. 4 is a fragmentary view, with parts in section, taken along section line IV—IV of FIG. 3; and
FIG. 5 is an enlarged fragmentary view with parts in section of the left end of the suspension assembly of FIG. 3.

The industrial truck shown in FIG. 1 has a lift assembly 11 at its forward end which includes load engaging forks, one of which is shown at 12, carried by a vertical extendible mast 13. The forward end of the truck is supported by non-steerable drive wheels one of which is shown at 14. The rearward end of the truck is supported by a pair of dirigible wheels, one of which is indicated at 16. The dirigible wheels are controlled through conventional steering means associated with the steering wheel 17.

The present invention particularly relates to a suspension assembly for supporting the rearward end of the truck upon the dirigible wheels 16. The suspension assembly is particularly adapted to permit limited oscillation of the truck frame relative to the dirigible wheel axle while maintaining engagement of all of the wheels 14 and 16 with the ground. The suspension assembly and its relation to the dirigible wheel 16 and the truck frame 18 are generally shown in FIG. 2. The wheels 16 are respectively pivoted at 19 to a steering axle or beam 21. Steering of the wheels 16 is accomplished by a drag link 22 associated with the steering wheel 17 of FIG. 1 in a conventional manner. The drag link 22 is associated with the wheels 16 by means of a pivot lever 23 and tie rods 24 and 26 which are connected respectively to the wheels 16.

The suspension assembly includes a leaf spring 27 and mounting brackets 28 and 29 as shown in FIG. 2 for supporting the rearward end of the truck upon the axle 21. The suspension assembly is described with particular reference to FIGS. 3–5. The leaf spring 27 is secured generally at its mid-length to the axle 21 by means of screws 31 with the spring being arranged normally to the axle 21 and parallel to a longitudinal axis through the truck of FIG. 1. The ends of the springs 27 extend respectively into the mounting brackets 28 and 29 which in turn are secured to members 32 and 33 of the truck's frame 18 (see FIG. 2).

The mounting bracket 28 is shown in detail in FIGS. 4 and 5 while the other mounting bracket 29 is generally similar except for modifications discussed below. Referring now to FIGS. 4 and 5, the mounting bracket 28 is secured to the frame member 32 by means of screws 34. A resilient pad 36 is fixed to the bracket 28 about the respective end of the spring 27 so that weight of the truck is transferred to the spring 27 and axle 21 through the resilient pad 36. The resilient pad illustrated in FIGS. 4 and 5 is preferably comprised of a suitable elastomeric composition. A pin 37 extends inwardly from the bracket 28 and fits within a slot 38 formed at the end of the spring 27. In this manner, the pin 37 is effective to limit longitudinal and lateral motion of the spring 27 within the bracket 28. With the weight of the truck being supported on the spring by the resilient pad 36, the spring 27 and rigidly connected axle 21 are free to oscillate about a longitudinal axis of the truck. The resilient pad 36 permits rotation of the spring 27, as may be best seen in FIG. 4, while continuing to support the weight of the truck upon the spring. A rigid retainer is secured to the bracket 28 around the resilient pad 36. The retainer 39 serves as a stop for limiting the amount of oscillation or rotation which the spring 27 may experience within the bracket 28. The retainer 39 may also be employed to assist in maintaining the position of the resilient pad 36 within the bracket 28.

The ends of the spring 27 may be arranged either above or below members of the truck frame 18. As seen in FIG. 3, the left end of the spring 27 is above the frame member 32 while the right end of the spring 27 is below the frame member 33. The resilient pad 36 and pin 37 cooperate similarly with the spring in either arrangement. With the spring being arranged below the frame member, as seen at the right end of FIG. 3, a similar pin 37' acts to limit longitudinal or lateral motion of the respective end of the spring 27. However, in that arrangement, a resilient pad and stop member similar to those indicated respectively at 36 and 39, in FIG. 4, would be arranged above the spring on the frame member 33 instead of the bracket 29. In this manner, the resilient pad employed at the right end of the spring 27 would also be effective to support the weight of the truck upon the spring.

The pin 37' at the right end of the spring 27 as seen in FIG. 3, is permanently secured to the bracket 29. To provide means for taking up slack between the brackets 28, 29 and the spring 27, the pin 37 at the left end of the spring 27 is threaded into the bracket 28. The pin or screw 37 may be adjusted to insure that both of the pins 37 and 37' are in engagement with the spring 27 in order to prevent longitudinal shifting of the spring 27 and axle 21 relative to the truck frame.

The present suspension assembly provides a simple and particularly effective means for supporting an industrial truck upon an axle. While the leaf spring 27 provides a soft ride, the pins 37, 37' and the resilient pads, one of which is indicated at 36, permit the axle 21 to oscillate about a longitudinal axis of the truck so that all wheels of the truck remain in firm engagement with the ground during operation.

What is claimed is:

1. A suspension assembly for an industrial truck having a frame, a pair of wheels supporting one end of the frame, an axle having dirigible wheels mounted at each side thereof, tie rod means operatively associated with the dirigible wheels for steering the truck, the suspension assembly supporting the other end of the frame upon the axle, comprising a leaf spring arranged normally to the axle and secured thereto at its center, means secured to the frame and interacting with said leaf spring to limit longitudinal and lateral shifting of said leaf spring relative to the frame, and a resilient pad secured to the frame and arranged above each end of said leaf spring, said resilient pads permitting oscillation of the axle about a longitudinal axis of the frame.

2. The invention of claim 1 further comprising stop means arranged on each side of said pads relative to said leaf spring to limit oscillation of said leaf spring and axle relative to the frame.

3. The invention of claim 2 wherein said pads are of elastomeric composition and said stop means are effective as retainers for said pads.

4. The invention of claim 1 wherein said means are limiting longitudinal and lateral shifting of said spring comprise pins secured to the frame by means of respective brackets, said pins being parallel with said spring and respectively engaging notches formed in each end of said spring.

5. The invention of claim 4 wherein one of said pins threadedly engages the respective bracket and is adjustable with respect to said spring.

6. The invention of claim 4 wherein one end of said spring is arranged above a portion of the frame, one of the brackets is secured to the frame portion and one pad is secured to the frame by means of the one bracket.

7. The invention of claim 1 wherein the truck has a lift assembly mounted at the one end of its frame and the wheels at the one end of the frame are powered.

References Cited

UNITED STATES PATENTS

| | | | |
|---|---|---|---|
| 1,621,676 | 3/1927 | Masury | 287—54 |
| 2,744,764 | 5/1956 | Weaver | 280—112 |
| 2,835,507 | 5/1958 | Davies | 280—112 |
| 2,973,951 | 3/1961 | Billing | 267—54 X |
| 2,999,679 | 9/1961 | Ulderup et al. | 267—56 X |

KENNETH H. BETTS, Primary Examiner

U.S. Cl. X.R.

280—112